United States Patent
Aoki

[15] 3,678,782
[45] July 25, 1972

[54] VISCOUS RUBBER DAMPERS
[72] Inventor: Hidemasa Aoki, 12-5, Nishigotanda 8-Chome, Shinagawa-ku, Tokyo-to, Japan
[22] Filed: July 28, 1970
[21] Appl. No.: 58,784

[30] Foreign Application Priority Data
Nov. 15, 1969  Japan..................................44/108011

[52] U.S. Cl..............................................74/574, 188/1 B
[51] Int. Cl..........................................................F16f 15/12
[58] Field of Search............................74/574; 188/1 B

[56] References Cited

UNITED STATES PATENTS

| | | | |
|---|---|---|---|
| 3,410,369 | 11/1968 | Ishizuka | 74/574 X |
| 3,495,475 | 2/1970 | Rumsey | 74/574 |
| 1,949,520 | 3/1934 | Whisler | 74/574 |
| 2,724,893 | 11/1955 | O'Connor et al. | 74/574 |
| 3,440,899 | 4/1969 | McGavern et al. | 74/574 |

Primary Examiner—William F. O'Dea
Assistant Examiner—F. D. Shoemaker
Attorney—Ernest G. Montague

[57] ABSTRACT

In a damper comprising a mounting disc, annular rubber rings secured to the opposite sides of the mounting disc, a dish shaped outer inertia mass member accommodating the mounting disc and the annular rubber rings, and an outer inertia mass member closing the opening of the outer inertia mass member and a viscous fluid filled in a spaced defined between inner and outer mass members, the dish shaped outer inertia mass member is provided with a flange which is folded inwardly onto the outer peripheral surface of the inner inertia mass member.

4 Claims, 6 Drawing Figures

Patented July 25, 1972
3,678,782
FIG.1  FIG.2  FIG.6
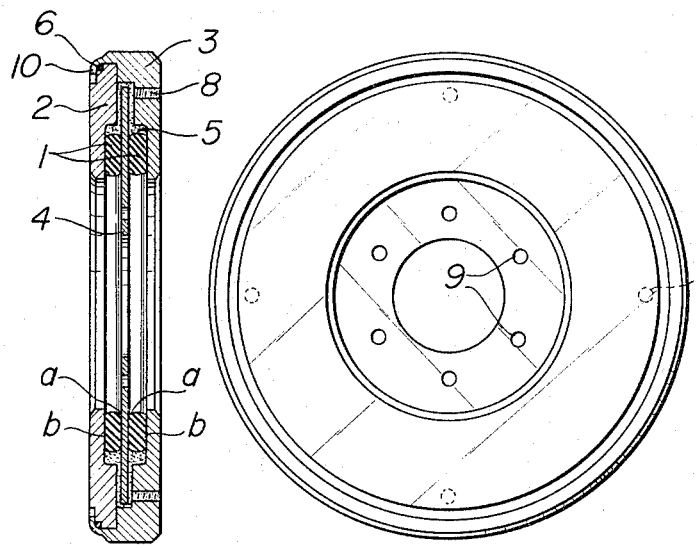
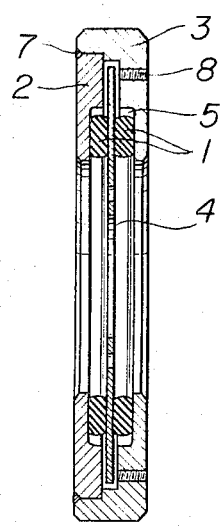
FIG.3  FIG.4  FIG.5
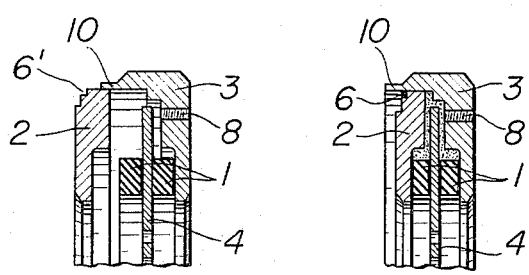
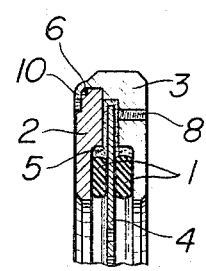
INVENTOR.
Hidemasa Oaka
BY Ernest Montague
Attorney

VISCOUS RUBBER DAMPERS

BACKGROUND OF THE INVENTION

This invention relates to improvements of viscous rubber dampers useful to be mounted upon an oscillating body, for example, a crankshaft of various internal combustion engines to damp or attenuate torsional vibrations generated during the operation of the engines. The damper of the type referred to above is secured to the engine crankshaft by means of a number of bolts extending through bolt openings of a circular mounting disc to transmit the rotational motion of the crankshaft to an inertia mass through the mounting disc, rubber and viscous fluid (ordinarily consisting of a silicone oil). In this manner, the torsional vibrations of the crankshaft are absorbed by the resiliency of the rubber and by the shear resistance of the viscous fluid thus protecting the engine against detrimental accidents such as breakage of the crankshaft.

According to a prior method, a damper is formed by receiving in an outer inertia mass member a mounting disc with annular rubber members bonded to the opposite surfaces fitting an inner inertia mass member in the outer inertia mass member, bonding said inner and outer inertia mass members with rubber members by means of a suitable adhesive, electrically welding the periphery of the joint between the outer and inner inertia mass members whereby to bond them together into a unitary inertia mass member, thus preventing leakage of the viscous fluid filled in the interval space. According to this construction, however, owing to the high temperature of the electric welding the joints between the rubber and inertia mass members are impaired so that during welding operation it is necessary to immerse entirely the damper except portions thereof which are to be welded.

SUMMARY OF THE INVENTION

It is therefore an object of this invention to provide an improved damper of improved characteristics.

According to this invention, the outer inertia mass member is provided with a flange which is folded inwardly onto the outer surface of the inner inertia mass member. With this improved construction the inner and outer inertia mass members can be bonded to the annular rubber members by the identical process steps as those of the prior art construction but no welding operation is required. A rubber packing ring is interposed between the inner surface of the flange of the outer inertia mass member and a shoulder or a stepped portion at the outer periphery of the inner inertia mass member and the flange is folded inwardly onto the outer surface of the inner inertia mass member by a pressing or rolling operation. In this manner, leakage of the viscous fluid filled in the interior of the damper is perfectly prevented. Moreover, sealing can be made by an extremely simple operation without damaging the bonding of the rubber rings. This is very important because the bonding strength of the annular rubber rings to the outer inertia mass member is smaller than that between the annular rubber rings and the mounting disc. By the prior method utilizing electric welding, the adverse effect of the heat of welding is concentrated to the bonding between annular rubber rings and the outer inertia mass member thus greatly shortening the useful life of the damper. Since according to this invention electrical welding is not used, it is possible to eliminate above described problems.

BRIEF DESCRIPTION OF THE DRAWING

In the accompanying drawing:
FIG. 1 shows a sectional view of a viscous rubber damper embodying this invention;
FIG. 2 shows a plan view of the damper shown in FIG. 1;
FIGS. 3, 4 and 5 are partial sectional views of the damper illustrating successive steps of fabricating the same; and
FIG. 6 shows a sectional view of a prior art damper.

DESCRIPTION OF THE PREFERRED EMBODIMENT

Referring now to the accompanying drawing, FIGS. 1 and 2 show an improved damper of this invention comprising annular rubber rings 1, an inner inertia mass member 2 (a cover or lid), a dish shaped outer inertia mass member 3 (a casing), a circular mounting disc 4 sandwiched between annular rubber rings, a viscous fluid 5 contained in a space defined by the inner and outer inertia mass members 2 and 3, annular rubber rings 1 and circular disc 4, and a packing ring of rubber 6. To fabricate the damper, the annular rubber rings 1 are bonded to the opposite sides of mounting disc 4 by the primary curing step as shown in FIG. 3. Then the bonded annular rubber rings 1 and mounting disc 4 are contained in the dish shaped outer inertia mass member 3 and the inner inertia mass member 2 is then inserted in the outer inertia mass member through the opening thereof. Outer surfaces of rubber rings 1 confronting with the inner surfaces of the inner and outer inertia mass members are coated with a suitable binder prior to the assembly. After assembling the parts the assembly is heated under a slight pressure to ensure strong bonding between inner and outer inertia mass members and the annular rubber rings. Then the inner inertia mass member 2 is forced into the opening of the outer inertia mass member and then a rubber packing ring 6 is applied in a shoulder 6' on the outer periphery of the inner inertia mass member as shown in FIG. 4. The flange 10 of the outer inertia mass member 3 is then folded inwardly onto the outer peripheral surface of the inner inertia mass member by means of rolls or a press, as shown in FIG. 5. Initially the rubber packing ring 6 has a volume, 20 to 30 percent larger than the final volume. Then a suitable viscous liquid such as a silicone oil is filled into the above described space around the periphery of the mounting disc through an injection port 8 by means of a grease gun, for example. Thereafter the port 8 is sealed by a plug.

Thus, this invention provides a novel damper of fluid tight construction without using electrical welding. So that the bonding surface of the annular rings 1 is not impaired thus assuring long operating life.

FIG. 6 shows a sectional view of a prior art damper wherein inner and outer inertia mass members 2 and 3 are bonded by an electric welding at 7. Although the principle of operation of this prior art damper is the same as that of the novel damper, the bonding force between the annular rubber rings 1 and the inner and outer inertia mass members are greatly affected by the heat of welding. For this reason it has been necessary to weld the seam 7 while the damper is nearly completely submerged in cooling water.

What is claimed is:

1. In a damper comprising a mounting disc, annular rubber rings secured to the opposite sides of said mounting disc, a dish shaped outer inertia mass member accommodating said mounting disc and said annular rubber rings, an inner inertia mass member closing the opening of said outer inertia mass member and a viscous fluid filled in a space defined between said inner and outer inertia mass members, the improvement which comprises a flange on the outer periphery of said outer inertia mass member, said flange being folded inwardly onto the outer peripheral surface of said inner inertia mass member.

2. The improvement according to claim 1 wherein a solid resilient packing ring is provided between said inner and outer inertia mass members to seal said space.

3. The damper, as set forth in claim 2, wherein
said inner inertia mass member has a planar annular outer surface facing in a direction away from said outer inertia mass member, and a lateral cylindrical surface,
said inner inertia mass member is formed with two annular recesses step-shaped in cross-section successively between said planar outer surface and said cylindrical surface, said flange having a thickness complementary to the thickness of the step-shaped recess adjacent said planar annular outer surface and folded over complementarily therein, said folded over flange being folded 90° relative to said cylindrical surface, and said solid resilient packing ring is a rubber O-ring and is pressed by said folded over flange into said other step-shaped recess.

4. The damper, as set forth in claim 3, wherein said folded-over flange completely covers said rubber O-ring and has an extreme end spaced from said planar annular outer surface of said inner mass member.

* * * * *